(12) United States Patent
Park et al.

(10) Patent No.: US 8,052,032 B2
(45) Date of Patent: Nov. 8, 2011

(54) COMPOSITE MATERIAL AND PRODUCING METHOD THEREOF

(75) Inventors: Seunghwan Park, Mito (JP); Satoshi Hirano, Hitachi (JP); Kazutaka Okamoto, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/645,779

(22) Filed: Dec. 23, 2009

(65) Prior Publication Data

US 2010/0167083 A1   Jul. 1, 2010

(30) Foreign Application Priority Data

Dec. 26, 2008 (JP) ................................ 2008-331818

(51) Int. Cl.
*B23K 20/12* (2006.01)

(52) U.S. Cl. ...................................................... 228/112.1

(58) Field of Classification Search ................ 228/112.1
See application file for complete search history.

(56) References Cited

U.S. PATENT DOCUMENTS

| 6,726,085 B2* | 4/2004 | Litwinski et al. | 228/112.1 |
| 2003/0192941 A1* | 10/2003 | Ishida et al. | 228/112.1 |
| 2009/0236403 A1* | 9/2009 | Feng et al. | 228/112.1 |

FOREIGN PATENT DOCUMENTS

| JP | 2005-272919 | 10/2005 |
| JP | 2007-229721 | 9/2007 |
| JP | 2009-142845 | 7/2009 |

OTHER PUBLICATIONS

Yoshiaki Morisada et al.; Surface Composites Fabricated by Friction Stir Processing; Osaka Municipal Technical Research Institute; May 12, 2006.

Y. Morisada et al.; Surface composites of magnesium alloy fabricated by friction stir processing; Preprints of the National Meeting of J.W.S.; 2006; No. 78.

Y. Morisada et al.; Surface $C_{60}$/AZ31 nanocomposite fabricated by friction stir processing; Preprints of the National Meeting of J.W.S.; 2006; No. 79.

* cited by examiner

*Primary Examiner* — Jessica L Ward
*Assistant Examiner* — Nicholas D'Aniello
(74) *Attorney, Agent, or Firm* — Antonelli, Terry, Stout & Kraus, LLP.

(57) ABSTRACT

An object of the present invention is to provide a method for producing a composite material that can prevent a powdered additive to be mixed from scattering and control a quantity of the additive dispersed in the composite material.

A method for producing a composite material in which an additional material different from a base material is dispersed into a part of the base material comprises the steps of providing a wire rod formed by applying a metallic film to the additional material to be dispersed or by stuffing a metallic tube with the additional material to be dispersed, fixing the wire rod on a surface or into an inside of the base material, and applying stirring along the fixed wire rod with a tool for friction stirring to disperse the additional material into the part of the base material.

12 Claims, 6 Drawing Sheets

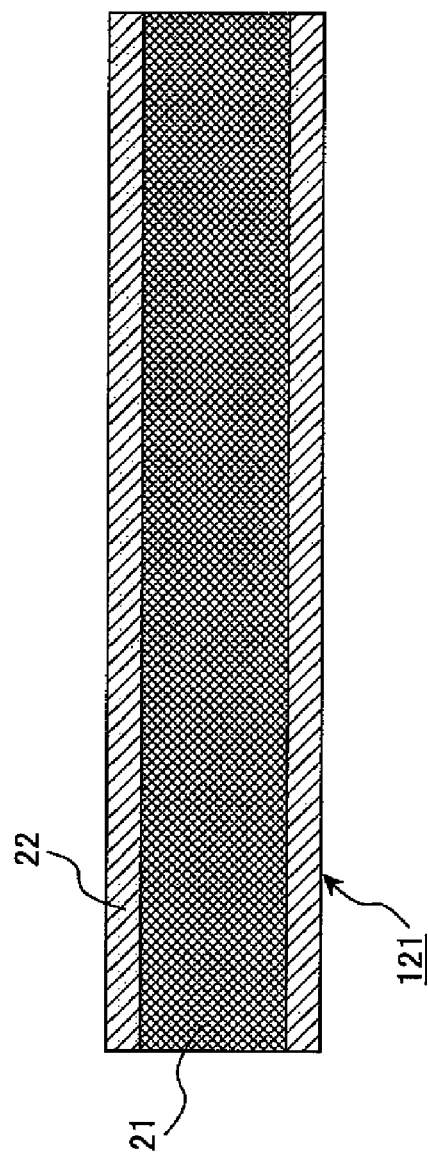
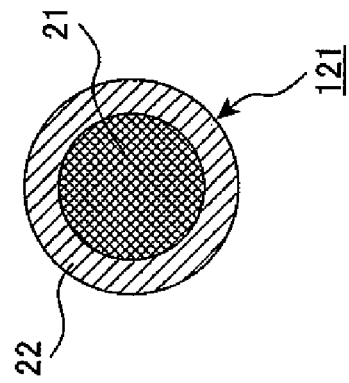
FIG. 2B
FIG. 2A

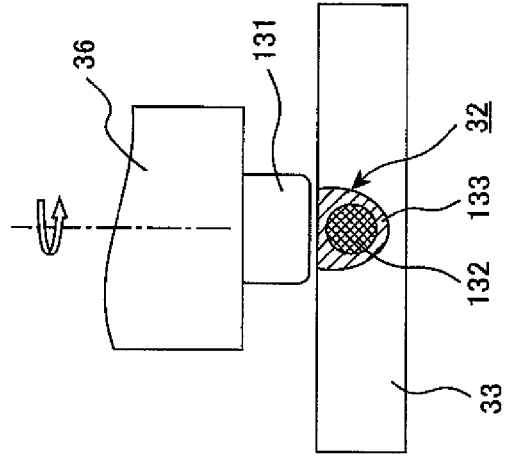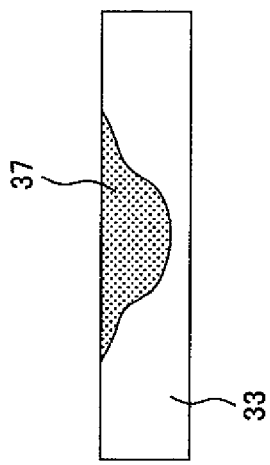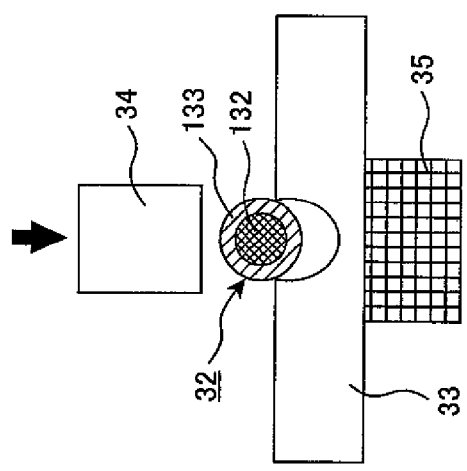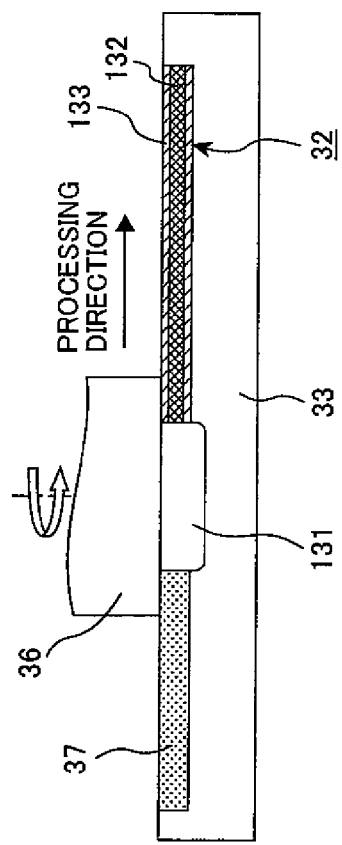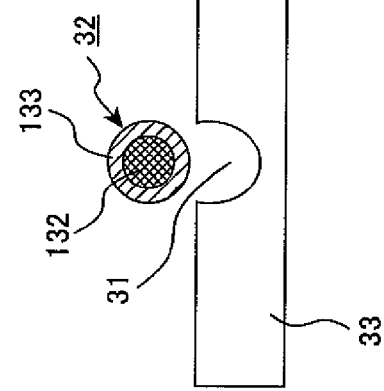

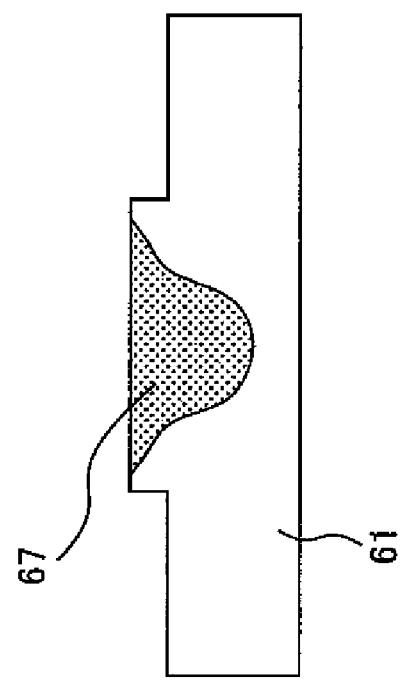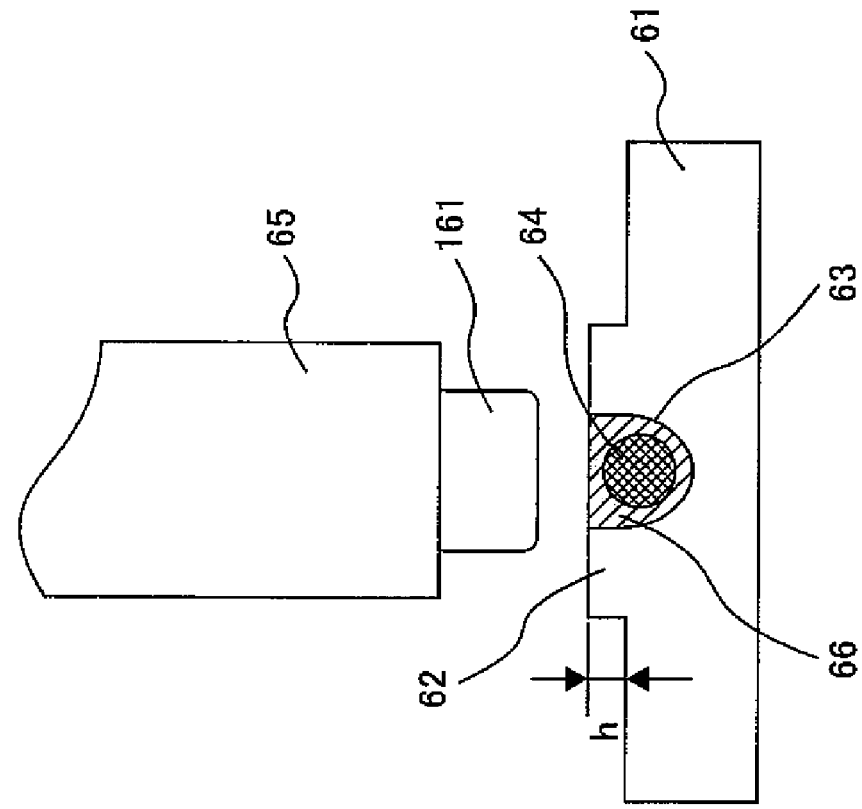

US 8,052,032 B2

COMPOSITE MATERIAL AND PRODUCING METHOD THEREOF

CLAIM OF PRIORITY

The present application claims priority from Japanese Patent application serial No. 2008-331818, filed on Dec. 26, 2008, the content of which is hereby incorporated by reference into this application.

BACKGROUND OF THE INVENTION

1. Field of the Invention

The present invention relates to a composite material produced by using a material of a different kind or a different shape, and a producing method of the composite material.

2. Description of Related Art

Techniques of mounting a tabular material or the like on a base material, and forming a composite material and modifying the surface by using a tool for friction stirring are disclosed in Patent Literature 1 (Japanese Patent Laid-open No. 2005-272919) and Patent Literature 2 (Japanese Patent Laid-open No. 2007-229721). Further, a technique of producing a composite material by forming a groove or the like on the surface of a base material, applying a powdered additive, and dispersing the additive with a tool for friction stirring is disclosed in Non-Patent Literature 1 ("Surface Composites Fabricated by Friction Stir Processing", Osaka University, May 12, 2006).

In the above Patent Literatures and Non-Patent Literature 1, methods for producing a composite material using friction stirring are disclosed.

SUMMARY OF THE INVENTION

The present invention provides a composite material formed by mixing an additive of powder (a powdered additive to be mixed) or the additive having another shape with a base material at an intended ratio, and a producing method thereof.

In the present invention, a method for producing a composite material in which an additional material different from a base material is dispersed into a part of the base material comprises the steps of providing a wire rod formed by applying a metallic film to the additional material to be dispersed or by stuffing a metallic tube with the additional material to be dispersed, fixing the wire rod on a surface or into an inside of the base material, and applying stirring along the fixed wire rod with a tool for friction stirring to disperse the additional material into the part of the base material.

An embodiment of the present invention provides a method for producing a composite material in the state where an additive does not touch a member for mixing a base material (for example, a shoulder of a tool for friction stirring) with the additive directly.

Another embodiment of the present invention provides a method for producing a composite material by putting a wire rod having a metallic film to protect powder from the tool for friction stirring or a wire rod formed by stuffing a metallic tube with powder on a base material, and mixing the wire rod with the base material, including a composite material produced by using the method.

The present invention makes it possible to provide a method for producing a composite material that can prevent powder to be mixed from scattering and control the quantity of the dispersed additive.

BRIEF DESCRIPTION OF THE DRAWINGS

FIG. 2A is a transverse sectional view illustrating a wire rod comprising a material to be mixed and a metallic tube.

FIG. 2B is a longitudinal sectional view illustrating a wire rod comprising a material to be mixed and a metallic tube.

FIG. 3A is a transverse sectional view illustrating a base material having a groove thereon and a wire rod to be inserted before stirring.

FIG. 3B is a transverse sectional view illustrating a step of inserting the wire rod to the groove.

FIG. 3C is a transverse sectional view illustrating a step of stirring the wire rod and the base material.

FIG. 3D is a longitudinal sectional view illustrating the step of stirring the wire rod and the base material.

FIG. 3E is a transverse sectional view illustrating the base material after the step of stirring.

FIG. 6A is a transverse sectional view illustrating a wire rod embedded on a surface of abase material in a partially exposed state.

FIG. 6B is a transverse sectional view illustrating a stirred portion on the surface of the base material.

DETAILED DESCRIPTION OF THE PREFERRED EMBODIMENTS

In an embodiment of the present invention, a material to be processed is produced by fixing or embedding an additive formed into a shape of a wire rod on a surface of a base material and the wire rod and the base material are stirred along a part of the wire rod in the material to be processed with a tool for friction stirring in order to form a composite material having a different characteristics on a part or all of the surface of the base material.

The embodiment of the present invention is explained in detail in reference to drawings.

Figure 1:
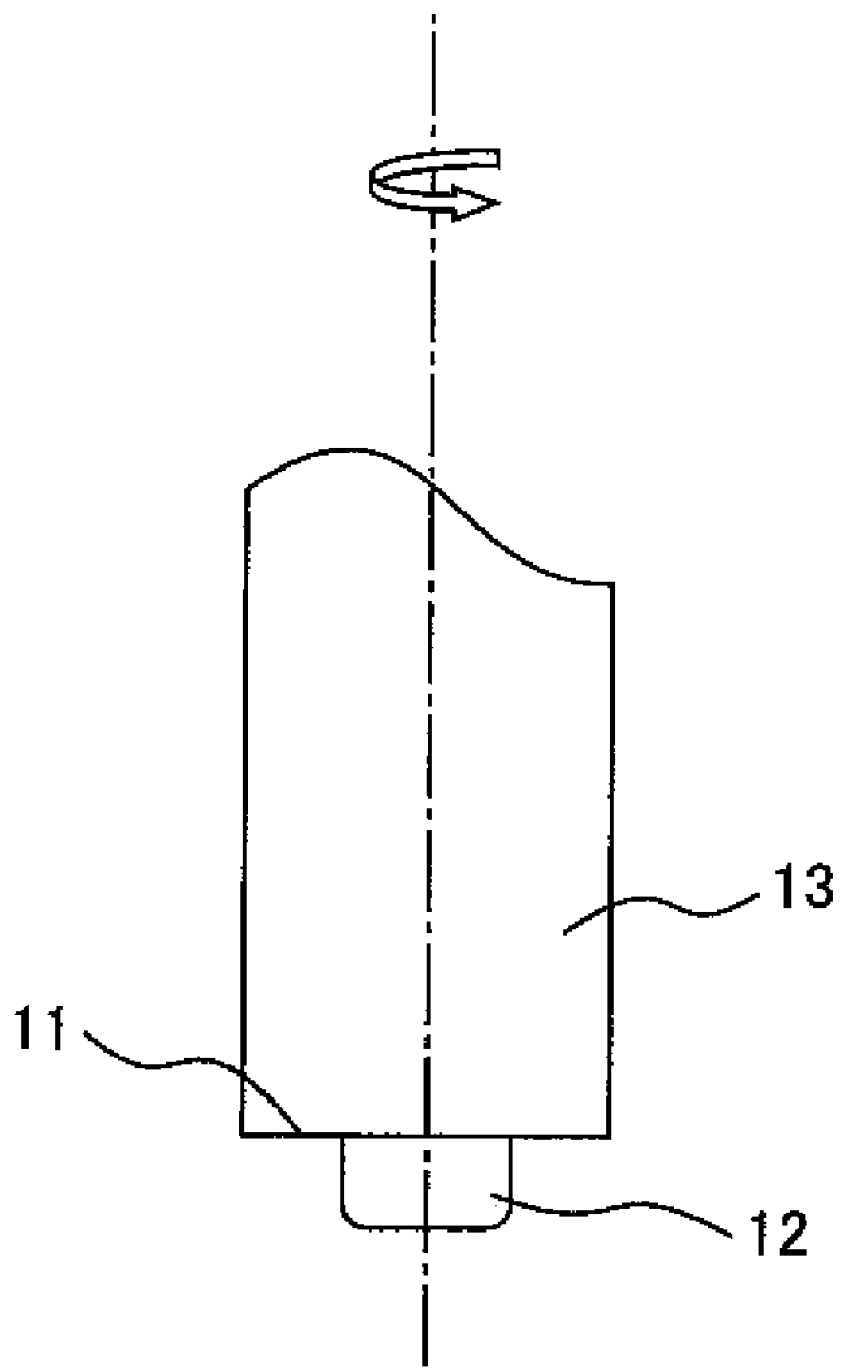
FIG. 1 is a side view illustrating a tool for friction stirring.

FIG. 1 is a side view illustrating a tool for friction stirring.

A tool for friction stirring 13 has a shoulder 11 and a pin-shaped probe 12 disposed in the manner of protruding from an end surface of the shoulder 13. Here, it is also possible to use the tool for friction stirring 13 in which the pin-shaped probe 12 does not protrude. It is desirable that a diameter of the pin-shaped probe 12 is larger than an outer dimension of the wire rod.

Various kinds of shapes such as a planar shape and a cylindrical shape can be applied to the base material. It is desirable to form a groove for disposing a wire rod before the wire rod is used. It is possible to smoothen a surface of the composite material by setting a sectional area of the groove at an area nearly equal to a sectional area of the wire rod (about 90% to 110% of the sectional area of the groove). Further, it is desirable to impose pressure after combining the wire rod with the base material, embed the wire rod into the groove, and make them stick together. When the sectional area of the wire rod is smaller than the sectional area of the groove (when the sectional area of the wire rod is less than 100% of the sectional area of the groove), an inner surface of the groove and the base material are made to stick together by applying pressure with a roller having a width smaller than the width of the groove or the like. Furthermore, it is also possible to form a protruding section having a groove on the base material beforehand; fix the wire rod to the protruding section and stir them; and thereafter cut off the protruding section.

A general metal can be used as the base material in the present invention. Examples of the metal are aluminum, iron, copper, titanium, magnesium, nickel, zinc, silver, and an alloy thereof including steel.

Examples of the wire rod are a substance formed by applying a metallic film to an additive having a shape of the wire rod, and a substance formed by containing an additive being a powder type or having a shape of a wire rod in a metallic tube. It comes to be possible to disperse a powdered additive in the base material and strengthen equipment for example. An additive to be mixed is not limited to a shape of the powder, but an effect of preventing scattering the powder is large in case of the powder. Further, when a compound generating gas is added, it is possible to increase the content of the generated gas component in the composite material by using the wire rod having a cover or coating. When the composite material is produced by using the additive having the gas component as the wire rod, it is possible to set a decomposition temperature of the material having the gas component at a lower temperature than a friction stirring temperature of the base material, and generate the gas component simultaneously with the friction stirring. Further, it is also possible to set the decomposition temperature of a material having the gas component at a higher temperature than the friction stirring temperature of the base material, and generate the gas by applying heat treatment after the composite material is produced.

A producing and processing apparatus of the composite material for carrying out the above processing comprises a pressure imposing unit for applying pressure and making the wire rod stick to the base material; and a stirring unit for stirring the wire rod fixed to the base material together with the base material. Further, it is also possible to include a heating unit for heat-treating a stirred region and a cutting unit for cutting off a protrusion generated on a surface of the composite material by friction stirring or the like in order to smoothen the surface. Here, it is also possible to use the heating unit or the cutting unit as another processing apparatus for the composite material.

EXAMPLE 1

FIGS. 2A and 2B are a transverse sectional view and a longitudinal sectional view illustrating a wire rod comprising a material to be mixed and a metallic tube.

In FIGS. 2A and 2B, a wire rod 121 is formed by covering a material to be mixed 21 with a metallic tube 22.

In this example, the metallic tube 22 having 2 mm in inner diameter and 4 mm in outer diameter made of aluminum alloy is used. And Si powder having 45 micrometers in grain size is used as the material to be mixed 21 and the wire rod 121 is produced by stuffing the metallic tube 22 with the powder.

As the base material, a base material made of an aluminum alloy having the same chemical composition as the metallic tube 22 is used. A groove into which the wire rod 121 can be inserted is formed on the base material beforehand.

A shape of the groove formed on the base material, a method for inserting the wire rod and a positional relationship between the wire rod and the base material before stirring are shown in FIGS. 3A to 3E.

As shown in FIG. 3A, a width of a groove 31 is somewhat smaller than an outer diameter of a wire rod 32 and a depth of the groove 31 is somewhat larger than the outer diameter of the wire rod 32. The wire rod 32 is formed by covering a material to be mixed 132 with a metallic tube 133. A sectional area of the wire rod 32 is set so as to be nearly equal to a sectional area of the groove 31 and, when the wire rod 32 is inserted into the groove 31, the gap between them is set so as to be small.

As shown in FIG. 3B, after the wire rod 32 is put on the groove 31 formed on a base material 33, a load with a roller 34 is applied while a jig 35 receives the load, and the wire rod 32 is deformed and made to stick to an inner surface of the groove 31. By so doing, it is possible to apply stirring efficiently. As a method for inserting the wire rod 32 into the base material 33, there are press working and the like besides rolling with the roller 34. A sectional view of the base material 33 after the wire rod 32 is inserted is shown in FIG. 3C.

After the base material in which the wire rod is embedded is fixed on a processing table with a cramp (not shown) together with a liner (not shown), a probe 131 of a tool for friction stirring 36 is slowly inserted up to a prescribed depth, the processing table is moved at a prescribed bonding speed, and a stirring processing is applied. The wire rod 32 and the base material 33 are stirred at a main shaft rotation number of 200 to 1200 rpm (counterclockwise rotation) and at the bonding speed of 20 to 400 mm/min, and the Si powder (material to be mixed 132) packed in the wire rod 32 is dispersed in the base material 33. A schematic longitudinal sectional view of the process of dispersing the wire rod 32 with the tool for friction stirring 36 is shown in FIG. 3D.

The dispersion of the wire rod 32 is tested by using tools having various diameters of probes. When a tool for friction stirring 36 having the diameter of the probe 131 larger than the diameter of the wire rod 32, namely a probe 131 having a diameter of 5 mm or larger, is used, it is possible to stir the whole wire rod 32 including the metallic tube 133 simultaneously and disperse the Si powder in the base material 33. Consequently, it is desirable that the diameter of the probe 131 is larger than the inner diameter of the metallic tube 133. Here, when the diameter of the probe 131 is smaller than the inner diameter of the wire rod 32, it is impossible to obtain a composite material in which all powder is dispersed with single processing and several steps of stirring are required. When the diameter of the probe 131 is larger than the inner diameter of the wire rod 32 and smaller than the outer diameter of the wire rod 32, it is possible to stir the metallic tube 133 and the powder and produce a composite material. A schematic view representing the material after stirred is shown in FIG. 3E. The mixed powder disperses in the stirred portion 37 on the base material 33.

In case of the above composite material, it is possible to mix the Si powder (material to be mixed 132) with the base material 33 by stirring and strengthen the region where the composite material is formed.

Although the same material as the base material is used as the material for the metallic tube in this example, it is also possible to use different materials. For example, when a base material formed of aluminum and a metallic tube formed of copper are used, not only the powder in the metallic tube disperses in the base material but also aluminum in the base material reacts with copper in the metallic tube, and an intermetallic compound is formed in the region where the wire rod is stirred. By forming and dispersing the intermetallic compound, it is possible to produce a further strengthened member than the case of dispersing only Si powder. As combinations of such a base material and a metallic tube, besides the combination of aluminum and copper, there are the combinations of aluminum and magnesium, aluminum and steel, aluminum and titanium, copper and titanium and others.

Further, although a cross section of the wire rod has a round shape in this example, it is also possible to choose a square shape. On this occasion, a groove having a corresponding shape is formed on the base material. Furthermore, with regard to the shape of the wire rod, it is possible to change horizontal and vertical widths in accordance with the range where the friction stirring is applied.

EXAMPLE 2

Successively, an example in which a composite material made of a porous metal having many bubbles is produced by using a wire rod comprising a material to be mixed and a metallic tube is shown.

When the composite material of the porous metal having the bubbles is produced, it is possible to use a method of mixing an additional material to be dispersed (a material to be mixed) containing a component for generating a gas and generating gas through a heat treatment or the like. When a groove is formed on a base material, powder containing a gas component, for example $MgH_2$ or $TiH_2$, is embedded into the groove, and they are stirred with a tool for friction stirring however, the powder touches the shoulder of the tool and scatters. In addition to that, the powder is decomposed into metal and $H_2$ by the friction heat generated between the tool and the base material and tends to diffuse in the air. And hence the quantity of the gas mixed with the base material by stirring reduces considerably.

In this example, a method for solving the problems and producing a porous metal by using the powder containing the component for generating the gas and applying friction stirring is explained.

The above problems can be solved by using a wire rod comprising a metallic tube and the powder containing the component for generating the gas. By using the metal tube, it is possible to stir the powder without sweeping away the powder itself in the air and releasing the gas generated by the decomposition of the powder, and to disperse the powder in a composite material formed by stirring. The composite material selectively and partially containing a porous portion as stated above is suitable for a filter member.

In this example, an aluminum alloy is used as the base material and the metallic tube for the wire rod. The wire rod produced by stuffing the metallic tube containing the aluminum alloy with $MgH_2$ powder is prepared. Further, a groove is formed on the base material of the aluminum alloy and the wire rod is embedded into the groove in the same way as Example 1.

A porous metal having aluminum alloy as the base material is produced by stirring an upper part of the wire rod with the tool for friction stirring. Since $MgH_2$ decomposes at a temperature not higher than a stirring temperature of the base material of the aluminum alloy, namely at 550° C. or low, $MgH_2$ decomposes into Mg and $H_2$ and bubbles are generated instantly during the stirring. As such a combination, besides the combination of the base material of the aluminum alloy and the $MgH_2$ powder, there are the combinations of a base material formed of copper and $MgH_2$ or $TiH_2$ powder, a base material formed of iron and $Ca_2CO_3$ powder, and others.

In some combinations of a base material and a powder containing a component for generating a gas, it sometimes happens that most of the powder does not decompose into metal and gas instantly during stirring and the powder itself remains. An example is the combination of an aluminum alloy base material and $TiH_2$ powder. Since $TiH_2$ decomposes into Ti and $H_2$ at a temperature of about 600° C. or higher, the $TiH_2$ powder scarcely decomposes at the stirring temperature of the base material formed of the aluminum alloy of 550° C. Consequently, in case of the combination of the base material formed of the aluminum alloy and $TiH_2$ powder, it is necessary to apply heat treatment at a temperature at which $TiH_2$ decomposes after stirring process is applied. By applying the heat treatment, it is possible to obtain a porous metal in the stirred region.

The same material as the above base material or a material different from the above base material can be applied to the material of the metallic tube for the wire rod. When a different material is used, the base material reacts with the metallic tube and an intermetallic compound is formed. An advantage of forming the intermetallic compound is that the strength at a portion where the porous metal is formed increases.

EXAMPLE 3

Figure 4B:
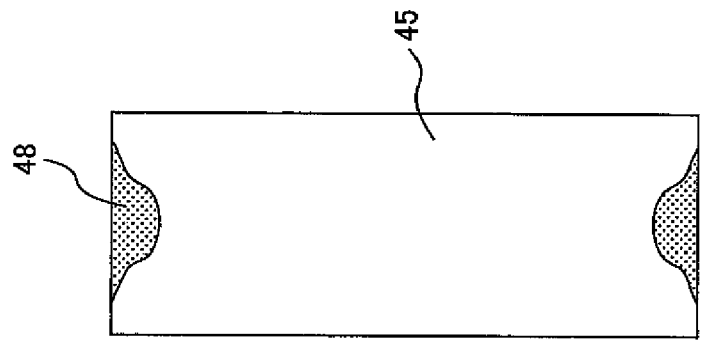
FIG. 4B is a longitudinal sectional view illustrating the columnar base material after the step of stirring.
Figure 4A:
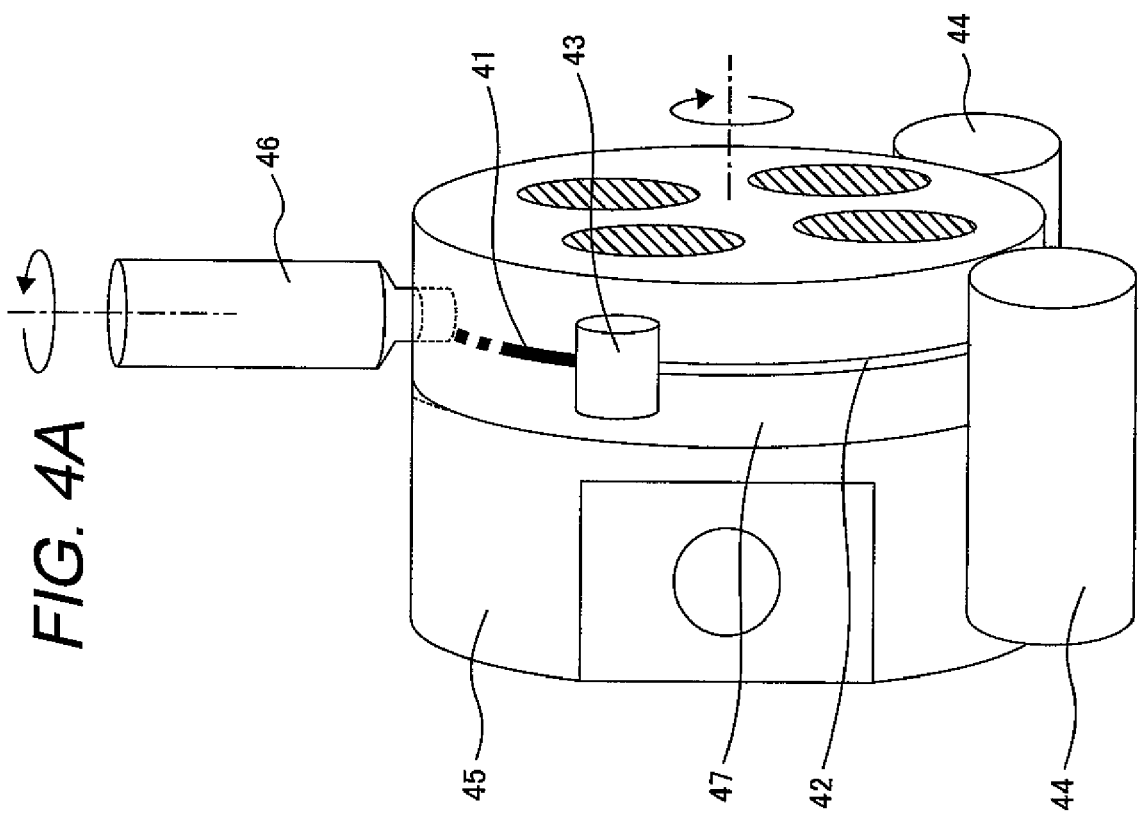
FIG. 4A is a perspective view showing a columnar base material and parts of a processing apparatus.

In this example, an apparatus for producing a composite material is explained in reference to FIGS. 4A and 4B.

FIG. 4A is a conceptual view showing the producing apparatus when the composite material is produced with a columnar base material and a wire rod.

This is a processing apparatus that can form a groove 42 on a side surface 47 of the columnar base material 45, embed the wire rod 41 comprising a metallic tube and powder into the groove, and stir the wire rod 41 and the columnar base material 45.

The wire rod 41 is inserted into the groove 42 with a roller 43. A vertical load applied from the roller 43 is supported by a receiving roll 44. The wire rod 41 is inserted into the groove 42 with the roller 43 while a columnar base material 45 is rotated. The inserted wire rod 41 is stirred with a tool for friction stirring 46 and powder contained in a center portion of the wire rod 41 is dispersed in the columnar base material 45. The vertical load applied with the tool for friction stirring 46 is supported by the receiving roller 44. The columnar base material 45 is rotated one revolution and a columnar composite member in which powder is continuously dispersed in the stirred portion 48 on the side surface 47 of the columnar base material 45 as shown in FIG. 4B is provided.

It is possible to form a porous metallic portion of a ring shape on the side surface 47 of the columnar base material 45 by using a powder containing a component for generating a gas as the powder of the wire rod 41. In the same way as Example 2, when the decomposition temperature of the powder is higher than the stirring temperature of the base material, it is possible to selectively produce a porous metal by applying heat treatment.

EXAMPLE 4

Figure 5B:
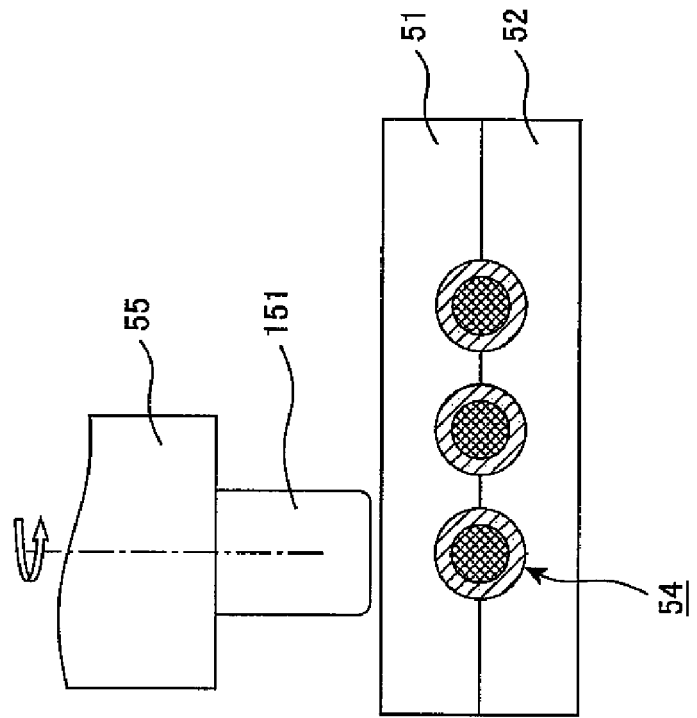
FIG. 5B is a transverse sectional view illustrating the base materials and the wire rods interposed between the base materials before stirring.
Figure 5A:
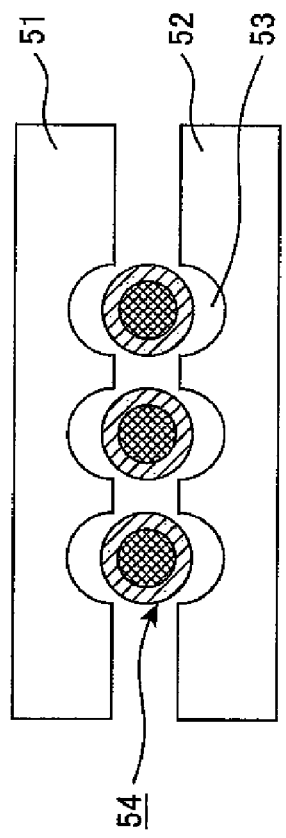
FIG. 5A is a transverse sectional view illustrating two pieces of base materials having grooves thereon and wire rods to be interposed between the base materials before stirring.
Figure 5C:
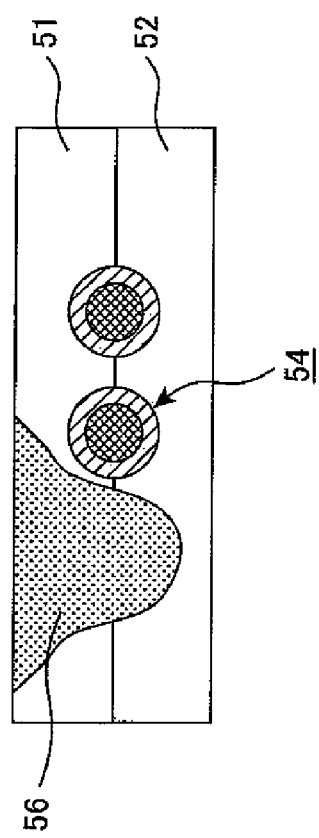
FIG. 5C is a transverse sectional view illustrating an intermetallic compound after stirring.

An example of a composite member containing powder or a porous portion widely dispersed in an inside of a base material is explained in reference to FIGS. 5A to 5C.

FIG. 5A is a view showing an example of the positional relationship between base materials and wire rods when the wire rods comprising a metallic film or a metallic tube and a material to be mixed are not exposed on a surface at which a shoulder of a tool for friction stirring touches a base material.

Two base materials 51 and 52 are used and grooves 53 are formed on at least one of the surfaces at which the base materials 51 and 52 touch each other (on both the surfaces in FIG. 5A). Wire rods 54 are interposed between the base materials 51 and 52 and the wire rods 54 are stirred in an inside between the base materials 51 and 52 from a side where a stirring energy of a tool for friction stirring reaches. It is possible to disperse an additive efficiently in the inside between the base materials 51 and 52 by setting the wire rods 54 and forming a composite material as stated above.

FIG. 5B is a transverse sectional view illustrating the base materials and the wire rods interposed between the base materials before stirring.

In this figure, a tool for friction stirring 55 has a pin-shaped probe 151. The wire rods 54 are stuck in the groove of the base materials 51 and 52.

FIG. 5C is a transverse sectional view illustrating an intermetallic compound after stirring.

In this figure, a portion subjected to friction stirring 56 is formed in a part of a range from an upper side of the base material 51 to an upper side of the base materials 52 (the inside between the base materials 51 and 52).

When the tool for friction stirring 55 touches the base material 51, and the base material 51 and the wire rod 54 are stirred from the upper side as shown in FIG. 5B, the base materials 51 and 52 are integrated and simultaneously the composite material is formed at the portion subjected to friction stirring 56 as shown in FIG. 5C.

Although the stirring is applied from one side of the base material 51 in FIG. 5C, it is also possible to apply the stirring from both sides of the base materials 51 and 52. The other portions of the base materials 51 and 52 where the wire rods 54 are not disposed may also be integrated by friction stirring or another means. Further, although two base materials 51 and 52 and the wire rods 54 interposed between the base materials 51 and 52 are used in this example, it is also possible to form through-holes in one of the base materials 51 and 52, insert wire rods 54, and thus produce a composite member having a similar shape.

In this example, the wire rods 54 are interposed between two base materials 51 and 52, but the wire rods 54 maybe interposed between three or more base materials (pluralities of base materials).

EXAMPLE 5

An example of a composite member having powder or a porous portion on a surface of a base material is explained.

When a composite material is formed by the method described in Example 1, it sometimes happens that the quantity of a dispersed powder or the like is small on an outermost surface of the composite member and large in an inside thereof. The thickness of a metallic tube 66 (namely, a value obtained by dividing the value obtained by subtracting an inner diameter from an outer diameter by two) in a wire rod 64 to be stirred scarcely changes even after stirring and the metallic tube 66 remains at a protruding portion on the surface. If necessary, it is possible to apply processing for cutting the whole portion of the outermost surface and exposing the portion having the dispersed material in quantity. It is effective for the composite material in which a dispersed material is exposed for the purpose of improving a mechanical properties and a corrosion resistance on the surface of the base material 61 to adopt a method of forming a protrusion on the base material 61 and utilizing the protrusion.

A protrusion 62 is formed on a base plate 61 beforehand and a groove 63 is formed on the protrusion 62 as shown in FIG. 6A. A wire rod comprising a material to be mixed 64 and a metallic tube 66 is stuck in the groove 63. In this example, since the purpose is the modification of the surface property of the base material 61, the deepest portion of the groove 63 is located so as to be deeper than the surface of the base material 61 in order to efficiently expose the dispersed material at the portion where the protrusion 62 is cut off. Further, it is desirable to make the thickness of the metallic tube 66 smaller than the height h of the protrusion 62.

After the wire rod is inserted into the groove 63, stirring is applied with a tool for friction stirring 65, a portion corresponding to the protrusion 62 in a stirred portion 67 shown in FIG. 6B is cut off by machining. By so doing, it is possible to expose stirred and dispersed powder or the like on the surface of the base material 61.

The present invention makes it possible to prevent the powder to be mixed from touching directly the shoulder of the tool for friction stirring and scattering by the rotation of the tool for friction stirring.

Further, the present invention makes it possible to control the quantity of the mixed powder when the composite material is produced by friction stirring.

What is claimed is:

1. A method for producing a composite material in which an additional material different from a base material is dispersed into a part of the base material, comprising the steps of:
   forming a wire rod by applying a metallic film to the additional material to be dispersed or by stuffing a metallic tube with the additional material to be dispersed, wherein the additional material to be dispersed is powder and contains a hydride component for generating a gas;
   fixing the wire rod on a surface or into an inside of the base material; and
   applying stirring along the fixed wire rod with a tool for friction stirring to disperse the additional material into the part of the base material and form bubbles in the base material to form the composite material.

2. The method according to claim 1, wherein the wire rod is fixed into a groove formed on the base material.

3. The method according to claim 2, wherein the groove is formed at a protrusion formed on the base material.

4. The method according to claim 3, wherein the protrusion is cut off after the stirring.

5. The method according to claim 2, wherein the wire rod is stuck into the groove by a pressure imposing unit for imposing pressure on the wire rod.

6. The method according to claim 1, wherein the tool for friction stirring has a pin-shaped probe protruding on an end surface of the tool.

7. The method according to claim 6, wherein a diameter of the pin-shaped probe is larger than an outer dimension of the wire rod.

8. The method according to claim 1, wherein the component has a decomposition temperature lower than a stirring temperature of the base material during the stirring of the wire rod.

9. The method according to claim 1, further comprising a step of heating the composite material to generate bubbles after the stirring of the wire rod.

10. The method according to claim 1, wherein the wire rod is interposed between pluralities of the base materials.

11. The method according to claim 1, wherein the wire rod is inserted into a through-hole formed in the base material.

12. The method according to claim 1, wherein providing the wire rod includes applying the metallic film to additional material having a wire shape.

* * * * *